(12) United States Patent
Prest et al.

(10) Patent No.: US 9,027,630 B2
(45) Date of Patent: May 12, 2015

(54) INSERT CASTING OR TACK WELDING OF MACHINABLE METAL IN BULK AMORPHOUS ALLOY PART AND POST MACHINING THE MACHINABLE METAL INSERT

(75) Inventors: Christopher D. Prest, San Francisco, CA (US); Matthew S. Scott, Campbell, CA (US); Stephen P. Zadesky, Portola Valley, CA (US); Dermot J. Stratton, San Francisco, CA (US); Joseph C. Poole, San Francisco, CA (US); Richard W. Heley, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 13/541,481

(22) Filed: Jul. 3, 2012

(65) Prior Publication Data

US 2014/0007982 A1 Jan. 9, 2014

(51) Int. Cl.
*B22D 19/04* (2006.01)
*B22D 19/16* (2006.01)

(52) U.S. Cl.
CPC ............... *B22D 19/04* (2013.01); *B22D 19/16* (2013.01)

(58) Field of Classification Search
CPC ......... B22D 19/00; B22D 19/04; B22D 19/16
USPC .............. 164/91, 98–100, 108, 111
See application file for complete search history.

(56) References Cited

U.S. PATENT DOCUMENTS

| 5,288,344 | A | 2/1994 | Peker |
| 5,368,659 | A | 11/1994 | Peker |
| 5,618,359 | A | 4/1997 | Lin |
| 5,735,975 | A | 4/1998 | Lin |
| 6,325,868 | B1 | 12/2001 | Kim |
| 6,818,078 | B2 * | 11/2004 | Kim et al. ...................... 148/522 |
| 7,250,221 | B2 * | 7/2007 | Ballyns et al. ................ 428/609 |
| 7,575,040 | B2 | 8/2009 | Johnson |
| 2007/0079907 | A1 | 4/2007 | Johnson |
| 2008/0118387 | A1 | 5/2008 | Demetriou |
| 2010/0084052 | A1 | 4/2010 | Farmer et al. |
| 2010/0300148 | A1 | 12/2010 | Demetriou |
| 2012/0094141 | A1 * | 4/2012 | Kawamura et al. ........... 428/601 |
| 2013/0037177 | A1 * | 2/2013 | Chiang et al. ................. 148/403 |

FOREIGN PATENT DOCUMENTS

JP 2001-303218 10/2001

OTHER PUBLICATIONS

Inoue et al., "Bulk amorphous alloys with high mechanical strength and good soft magnetic properties in Fe—Tm—B (Tm=IV-VIII group transition metal) system", Appl. Phys. Lett., vol. 71, p. 464 (1997).
Shen Et., "Bulk Glassy CO43Fe20TA5.5B31.5 Alloy with High Glass-Forming Ability and Good Soft Magnetic Properties", Materials Transactions, vol. 42 No. 10 (2001) pp. 2136-2139.

* cited by examiner

*Primary Examiner* — Kevin E Yoon
(74) *Attorney, Agent, or Firm* — Brownstein Hyatt Farber Schreck, LLP (57) ABSTRACT

Provided in one embodiment is a method of forming a connection mechanism in or on a bulk-solidifying amorphous alloy by casting in or on, or forming with the bulk-solidifying amorphous alloy, a machinable metal. The connection mechanism can be formed by machining the machinable metal.

20 Claims, 8 Drawing Sheets

INSERT CASTING OR TACK WELDING OF MACHINABLE METAL IN BULK AMORPHOUS ALLOY PART AND POST MACHINING THE MACHINABLE METAL INSERT

FIELD OF INVENTION

This invention relates to methods of machining bulk solidifying amorphous alloy parts to provide, for example, a precision machined connection mechanism such as a threaded passage. The connection mechanism enables removable connection of the amorphous alloy part to a separate part.

BACKGROUND

Bulk-solidifying amorphous alloys have been made in a variety of metal systems. They are generally prepared by quenching from above the melting temperature to the ambient temperature. Generally, high cooling rates on the order of $10^{5\circ}$ C./sec, are needed to achieve an amorphous structure. The lowest rate by which a bulk solidifying alloy can be cooled to avoid crystallization, thereby achieving and maintaining the amorphous structure during cooling, is referred to as the "critical cooling rate" for the alloy. In order to achieve a cooling rate higher than the critical cooling rate, heat has to be extracted from the sample. Thus, the thickness of articles made from amorphous alloys often becomes a limiting dimension, which is generally referred to as the "critical (casting) thickness." A critical casting thickness can be obtained by heat-flow calculations, taking into account the critical cooling rate.

Until the early nineties, the processability of amorphous alloys was quite limited, and amorphous alloys were readily available only in powder form or in very thin foils or strips with a critical casting thickness of less than 100 micrometers. A new class of amorphous alloys based mostly on Zr and Ti alloy systems was developed in the nineties, and since then more amorphous alloy systems based on different elements have been developed. These families of alloys have much lower critical cooling rates of less than $10^{3\circ}$ C./sec, and thus these articles have much larger critical casting thicknesses than their previous counterparts. The bulk-solidifying amorphous alloys are capable of being shaped into a variety of forms, thereby providing a unique advantage in preparing intricately designed parts.

The use of hard materials in the formation of intricately designed parts for a variety of uses significantly improves the life of the article, but also imposes difficulties in its manufacture and assembly. Many parts of articles, such as electronic devices, machine parts, engines, pump impellers, rotors, and the like, must be assembled and connected to one another by a removable connection. Removable connections provide the advantage of being able to easily remove damaged parts and replace them with new or reconditioned parts. This is especially important when the respective parts move with respect to one another or are in an environment where they are subject to wear, and when parts are fabricated from different types of materials (metals having varying degrees of hardness and wear resistance, plastics, rubber materials, etc.). The exact design and construction of the connection of the part to other parts may vary widely between types, models, and manufacturers. Many parts that are made of softer metals may typically be machined to form a connection that will accommodate its connection with other parts. However, parts that are made of very hard materials such as bulk-solidifying amorphous alloys, are very difficult to machine and, therefore, present a problem with providing a precision machined connection mechanism.

SUMMARY

A proposed solution according to embodiments herein for providing a connection mechanism in a bulk-solidifying amorphous alloy part is a method of forming an object or part having a connection mechanism positioned therein or thereon in which the object or part is comprised in whole or in part of a bulk-solidifying amorphous alloy part, and in which the connection mechanism is provided in or on the amorphous alloy portion of the object or part. The bulk-solidifying amorphous alloy has positioned therein at least one cavity having positioned therein at least one machinable material, and that machinable material can be machined after formation of the object or part to form the connection mechanism in the portion of the object or part fabricated from the bulk-solidifying amorphous alloy. The method includes forming an object or part formed in whole or in part of a bulk-solidifying amorphous alloy having positioned therein at least one cavity, the at least one cavity having at least one contact surface. The method further includes insert casting or tack welding or tack welding into the at least one cavity a machinable metal having a hardness lower than the bulk-solidifying amorphous alloy and being capable of forming a metal-to-metal bond with the at least one contact surface of the cavity. The method concludes by machining the machinable metal to form the connection mechanism.

In accordance with another embodiment, there is provided a method of forming an object or part formed in whole or in part of a bulk-solidifying amorphous alloy having a connection mechanism. The method includes forming the object or part by forming the bulk-solidifying amorphous alloy portion so that it has positioned therein at least one cavity, the at least one cavity having at least one contact surface. The method also includes, while forming the bulk-solidifying amorphous alloy portion, also forming a machinable metal insert in the at least one cavity whereby the machinable metal insert has a hardness lower than the bulk-solidifying amorphous alloy and is capable of forming a metal-to-metal bond with the at least one contact surface of the cavity. The method concludes by machining the machinable metal to form the connection mechanism.

In accordance with another embodiment, there is provided a method of making an object or part formed in whole or in part of a bulk-solidifying amorphous alloy having a connection mechanism protruding therefrom. The method includes forming an object or part formed in whole or in part of a bulk-solidifying amorphous alloy part having at least one extending protrusion, the protrusion having at least one contact surface. The method also includes insert casting or tack welding onto the protrusion a machinable metal having a hardness lower than the bulk-solidifying amorphous alloy and being capable of forming a metal-to-metal bond with the at least one contact surface of the at least one protrusion. The method concludes by machining the machinable metal to form the connection mechanism.

Another embodiment includes a method of making an object or part formed in whole or in part of bulk-solidifying amorphous alloy having a connection mechanism protruding therefrom. The method includes forming an object or part formed in whole or in part of a bulk-solidifying amorphous alloy part having an external surface and optionally having at least one extending protrusion, the protrusion having at least one contact surface. The method also includes, while forming the bulk-solidifying amorphous alloy portion, forming a machinable metal protrusion extending from the bulk-solidifying amorphous alloy portion, the machinable metal having a hardness lower than the bulk-solidifying amorphous alloy and being capable of forming a metal-to-metal bond with the external surface of the bulk-solidifying amorphous alloy part, and optionally with at least one contact surface of the at least one protrusion. The method concludes by machining the machinable metal to form the connection mechanism.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
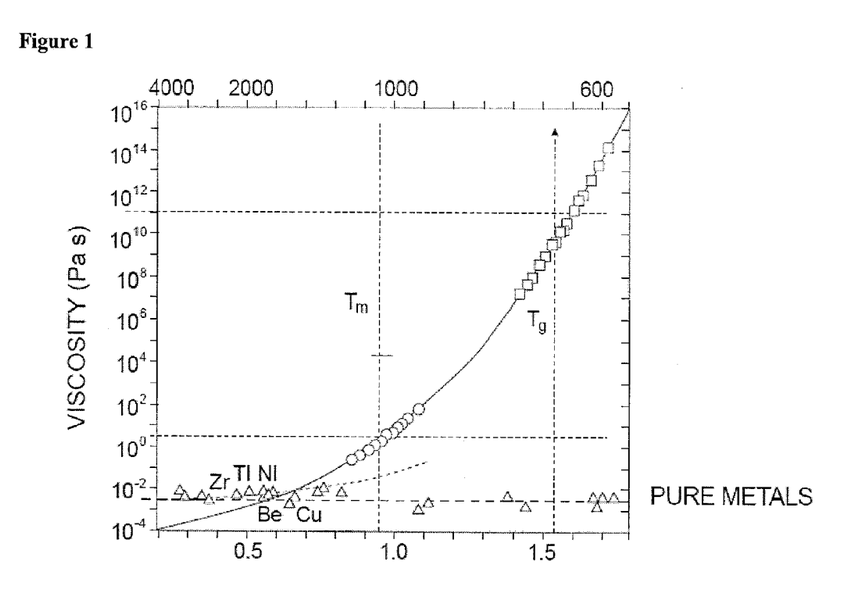
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
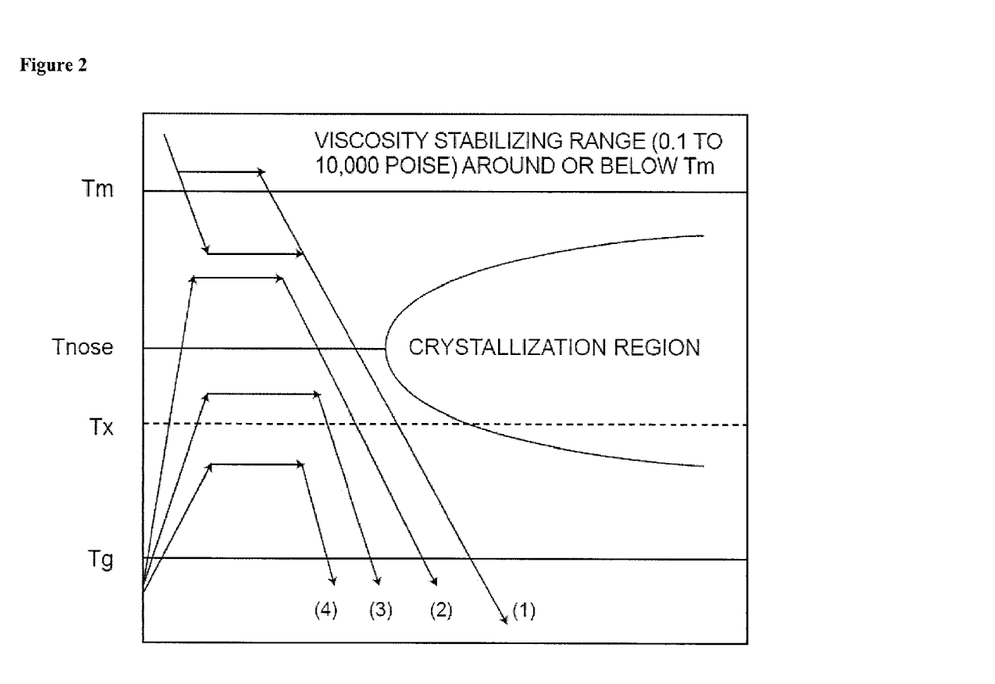
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between 1012 Pa s at the glass transition temperature down to 105 Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substeantially simultaneously with fast cooling to avoid the trajectory hitting the TTT curve. The procssing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula (Zr, Ti)a(Ni, Cu, Fe)b(Be, Al, Si, B)c, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula (Zr, Ti)a(Ni, Cu)b(Be)c, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula (Zr, Ti)a(Ni, Cu)b(Be)c, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula (Zr)a(Nb, Ti)b(Ni, Cu)c(Al)d, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the afore-described alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe 68.00% | Mo 5.00% | Ni 5.00% | Cr 2.00% | P 12.50% | C 5.00% | B 2.50% | |
| 2 | Fe 68.00% | Mo 5.00% | Ni 5.00% | Cr 2.00% | P 11.00% | C 5.00% | B 2.50% | Si 1.50% |
| 3 | Pd 44.48% | Cu 32.35% | Co 4.05% | P 19.11% | | | | |
| 4 | Pd 77.50% | Ag 6.00% | Si 9.00% | P 7.50% | | | | |
| 5 | Pd 79.00% | Ag 3.50% | Si 9.50% | P 6.00% | Ge 2.00% | | | |
| 5 | Pt 74.70% | Cu 1.50% | Ag 0.30% | P 18.0% | B 4.00% | Si 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr | Ti | Cu | Be | | |

TABLE 2-continued

Additional Exemplary amorphous alloy compositions (atomic %)

| Alloy | Atm % | Atm % | Atm % | Atm % | Atm % | Atm % |
|---|---|---|---|---|---|---|
|  | 35.00% | 30.00% | 7.50% | 27.50% |  |  |
| 11 | Zr | Ti | Co | Be |  |  |
|  | 35.00% | 30.00% | 6.00% | 29.00% |  |  |
| 12 | Zr | Ti | Fe | Be |  |  |
|  | 35.00% | 30.00% | 2.00% | 33.00% |  |  |
| 13 | Au | Ag | Pd | Cu | Si |  |
|  | 49.00% | 5.50% | 2.30% | 26.90% | 16.30% |  |
| 14 | Au | Ag | Pd | Cu | Si |  |
|  | 50.90% | 3.00% | 2.30% | 27.80% | 16.00% |  |
| 15 | Pt | Cu | Ni | P |  |  |
|  | 57.50% | 14.70% | 5.30% | 22.50% |  |  |
| 16 | Zr | Ti | Nb | Cu | Be |  |
|  | 36.60% | 31.40% | 7.00% | 5.90% | 19.10% |  |
| 17 | Zr | Ti | Nb | Cu | Be |  |
|  | 38.30% | 32.90% | 7.30% | 6.20% | 15.30% |  |
| 18 | Zr | Ti | Nb | Cu | Be |  |
|  | 39.60% | 33.90% | 7.60% | 6.40% | 12.50% |  |
| 19 | Cu | Ti | Zr | Ni |  |  |
|  | 47.00% | 34.00% | 11.00% | 8.00% |  |  |
| 20 | Zr | Co | Al |  |  |  |
|  | 55.00% | 25.00% | 20.00% |  |  |  |

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is Fe72Al5Ga2P11C6B4. Another example is Fe72Al7Zr10Mo5W2B15. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)—C—B, Co—Cr—Mo—Ln—C—B, Fe—Mn—Cr—Mo—(Y,Ln)—C—B, (Fe, Cr, Co)—(Mo, Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature Tx. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Embodiments

The preferred embodiments include a method of forming an object or part formed in whole or in part of a bulk-solidifying amorphous alloy having positioned therein at least one cavity, the at least one cavity having at least one contact surface. The method further includes insert casting or tack welding into the at least one cavity a machinable metal having a hardness lower than the bulk-solidifying amorphous alloy and being capable of forming a metal-to-metal bond with the at least one contact surface of the cavity. The method concludes by machining the machinable metal to form the connection mechanism.

Bulk-solidifying amorphous alloy materials are capable of being shaped and formed, using a variety of forming techniques such as extrusion molding, die casting, injection molding, and the like, to form intricately shaped metal objects that can be used in virtually limitless applications. When formed and cooled in accordance with the guidelines provided herein, the bulk-solidifying amorphous alloy metal objects can form extremely hard, intricately shaped parts that can be used for a variety articles, such as electronic devices, machine parts, engines, pump impellers, rotors, rotating drums, knives, cutting devices, and the like. These parts typically are assembled and connected to other parts that may or may not be made from bulk-solidifying amorphous alloys. Preferably, the parts are connected to one another by a removable connection so that if one or more parts becomes damaged, it can be removed and replaced. The preferred embodiments provide methods for making a connection mechanism in a part made in whole or in part from a bulk-solidifying amorphous alloy material where it otherwise would be extremely difficult and expensive to make the connection mechanism using known machining techniques.

Figure 3:
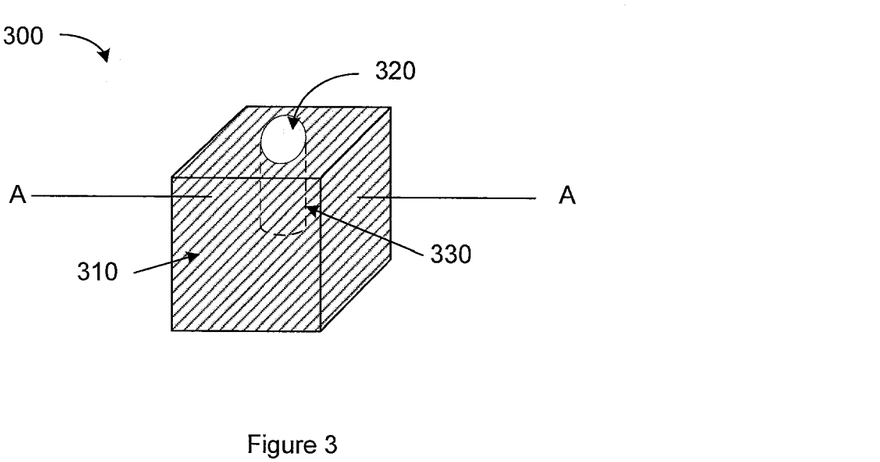
FIG. 3 provides a perspective view of a portion of a part having at least one cavity positioned therein in accordance with one embodiment of the invention.

One preferred method can be described with reference to FIGS. 3-6. FIG. 3 is a perspective view of a portion of a part 300. The part 300 may be made in whole or in part of a bulk-solidifying amorphous alloy material 310, in which the portion comprised of the bulk-solidifying amorphous alloy material is where at least one connection mechanism is intended to be placed. The connection mechanism can be formed in a cavity in the part, or on a protrusion, or the connection mechanism can be formed directly on an exterior surface of the bulk-solidifying amorphous alloy portion 310, as described in more detail below with reference to FIGS. 3-12.

Figure 4:
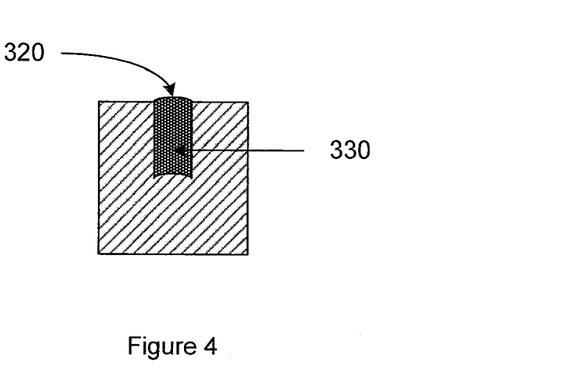
FIG. 4 provides a view of the portion of the part of FIG. 3 along the line A-A.

The bulk-solidifying amorphous alloy material portion 310 includes at least one cavity 320. FIG. 3 shows one cavity 320 on one surface, but the portion 310 may include multiple cavities positioned in any surface of portion 310. The at least one cavity has at least one contact surface 330, as shown more clearly in FIG. 4. The embodiments illustrated in FIGS. 3 and 4 depict the cavity 320 extending only partially through bulk-solidifying amorphous alloy portion 310, but those skilled in the art will appreciate that the cavity 320 may extend further or not as far as that shown in the drawings. In addition, cavity 320 is illustrated as having a cylindrical shape. Those skilled in the art will appreciate that cavity 320 may have a variety of shapes and sizes, including cylindrical, square, rectangular, triangular, and the like.

An advantage of forming part 300 by including at least one cavity 320 in the portion 310 of part 300 that is comprised of hard bulk-solidifying amorphous alloy is that the at least one cavity 320 can accommodate a variety of different sized connection mechanisms. Some parts may require different sized connection mechanisms depending on the manufacturer or assembling entity that assembles the final article. Fabricating intricately-shaped parts 300, having at least a portion comprised of bulk-solidifying amorphous alloy material 310 to either already be pre-formed with different sized connection mechanism, or by post-machining the hard alloy material, would be extremely time consuming and prohibitively expensive. Providing an appropriately sized cavity 320 that can accommodate various sized connection mechanisms enables fast and more cost effective manufacture of parts that can be assembled into final articles from a variety of entities.

As an example, part 300 could form all or a portion of a printed circuit board to be used in a variety of electronic devices. That printed circuit board may be comprised in whole or in part, and specifically, multiple portions may be comprised of bulk-solidifying amorphous alloy material 310, which has been advantageously used in many electronic devices. The bulk-solidifying amorphous alloy portion(s) 310, as the case may be, may in turn be connected to another printed circuit board, or an internal casing or housing. Different electronic device manufacturers may use different sized connection mechanisms to facilitate the connection of the part 300 to the housing, for example. The present embodiments provide a fast, efficient, and more cost effective method of manufacturing that part 300 so that it can be subsequently machined to accommodate the different electronic device manufacturing specifications, without the need to re-tool and re-cast or re-form a different part 300 for each device manufacturer. The embodiments also provide the ability for each electronic device manufacturer, or each assembling entity, to form their own connection mechanism, to provide for the precise location for the connection mechanism. These entities could form their own connection mechanism either by machining the appropriately-sized connection, or using a self-tapping connection device capable of tapping into machinable metal.

Figure 5:
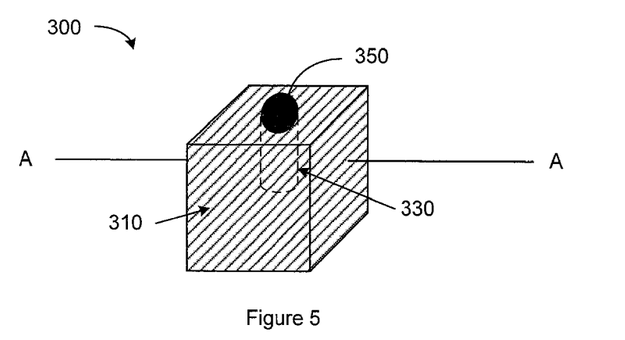
FIG. 5 provides a perspective view of the portion of the part of FIG. 3 in which the at least one cavity has been at least partially filled with a machinable metal.

A preferred method entails first forming a part 300 formed at least in part of a bulk-solidifying amorphous alloy 310, in which the alloy 310 has positioned therein at least one cavity 320 having at least one contact surface 330. The method further involves, as shown in FIG. 5, insert casting or tack welding into the at least one cavity 320, a machinable metal 350. The machinable metal 350 can be any machinable metal having a hardness lower than the bulk-solidifying amorphous alloy and being capable of forming a metal-to-metal bond with the at least one contact surface of the cavity. Insert casting may be carried out by pouring molten or semi-molten machinable metal into the at least one cavity 320, and then cooling the machinable metal to form a metal-to-metal bond with the bulk-solidifying amorphous alloy material. Alternatively, the at least one surface 330 of the cavity may be treated with a material that facilitates a metal-to-metal bond, such as a thin foil that will deform, melt, or otherwise fuse to the bulk-solidifying amorphous alloy 310 during the insert casting or tack welding procedure. In another embodiment, the at least one surface 330 may be treated to facilitate the metal-to-metal bond, for example, by a blasting treatment with a nonmetallic abrasive, or using a surface roughening treatment such as contact with an acid.

Tech welding may be carried out by welding a component of machinable metal to a surface within the cavity in the bulk-solidifying amorphous alloy material. Tack welds can be used as a means to hold the machinable component in the proper location, alignment, and distance apart, within the cavity of the bulk-solidifying amorphous alloy. In general, tack welding is performed by the same process that is used for welding. For example, aluminum-alloy component can be tack welded by friction stir welding or electron beam tack welds.

Tack welding is welding, even if the welds are deposited in separate short beads. It performs the following functions: holds the assembled components in place and establishes their mutual location; ensures their alignment; complements the function of a fixture, or permits its removal, if necessary; controls and contrasts movement and distortion during welding; sets and maintains the joint gap; and temporarily ensures the assembly's mechanical strength against its own weight if hoisted, moved, manipulated, or overturned.

Machinable metals 350 suitable for use in the present embodiments include aluminum, zinc, magnesium, tin, nickel, indium, antimony, copper, and alloys thereof. Other machinable metals could be used, including mercury, lead and lead alloys. Although these machinable metals are easily machined (even by hand), they often degrade or wear away over time thereby limiting their suitability. After the at least one cavity 320 has been at least partially filled with machinable metal 350, machinable metal 350 can be machined to form a connection mechanism.

Figure 6:
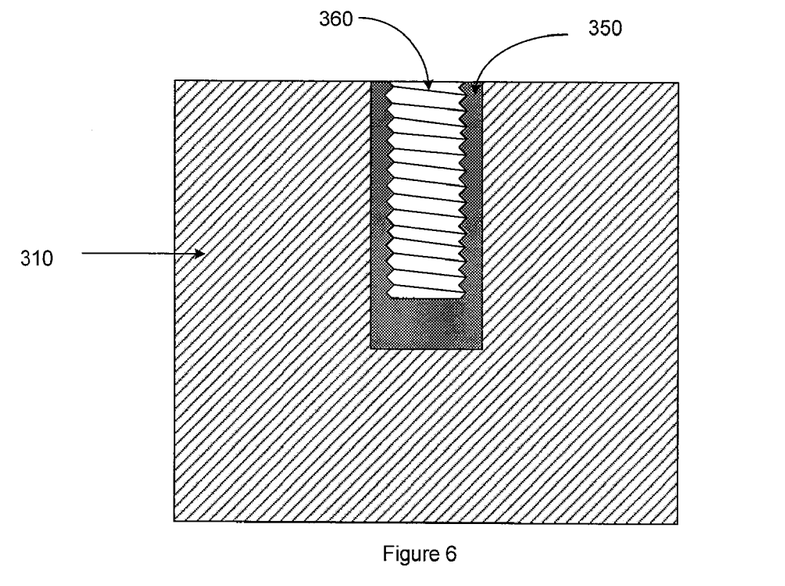
FIG. 6 provides a cross-sectional view of the portion of the part of FIG. 5 along the line A-A, after the machinable metal has been machined to form a connection mechanism.

FIG. 6 is a cross-sectional view of the part 300 along A-A, after machinable metal 350 has been machined to form a threaded bore to accommodate, for example, a screw or bolt or other threaded connection mechanism. Machinable metal 350 can be machined using any known technique to form a connection mechanism. Machining may be accomplished using a powered apparatus, machine, or by hand. Suitable machining techniques include, for example, threading, milling, drilling, carving, cutting, turning, routing, and the like. Machining also includes self threading connectors in which a self threading device may be inserted into machinable metal 350 and firmly seated therein.

While the embodiment shown in FIG. 6 depicts a connection mechanism 360 in the form of a threaded connection, other connection mechanisms 360 are contemplated, including friction fit connections, seating a threaded nut or other threaded connector within machinable metal 350 to receive a mating connector, seating a bolt within machinable metal 350 with extending threads to accommodate connection with another object, and the like. The connection mechanism preferably occupies only a portion of the machinable metal 350 so that sufficient machinable metal 350 remains in the at least one cavity 320 to provide a secure connection. In addition, the connection mechanism can be formed in the center of the machinable metal 350, or anywhere within cavity 320. This aspect of the invention provides the advantage that the precise location of connection mechanism 360 need not be determined during formation of part or object 300, thus eliminating the need for precision formation of a connection mechanism and providing for a fast, efficient, and cost effective means by which connection mechanism 360 can be formed in part or object 300 in various positions.

Another embodiment provides a method of forming an object or part formed in whole or in part of a bulk-solidifying amorphous alloy having a connection mechanism. The method includes forming the object or part by forming the bulk-solidifying amorphous alloy portion so that it has positioned therein at least one cavity, the at least one cavity having at least one contact surface. The method also includes, while forming the bulk-solidifying amorphous alloy portion, also forming a machinable metal insert in the at least one cavity whereby the machinable metal insert has a hardness lower than the bulk-solidifying amorphous alloy and is capable of forming a metal-to-metal bond with the at least one contact surface of the cavity. The method concludes by machining the machinable metal to form the connection mechanism.

In this method, the object or part 300 would be formed such that the bulk-solidifying amorphous alloy portion 310 of the part 300 is already formed with a soft meal 350 positioned in a predetermined location on the bulk-solidifying amorphous alloy portion 310, as shown in FIG. 5. This method eliminates the need for insert casting or tack welding the machinable metal 350 into cavity 320. The machinable metal portion then can be machined as described above to form connection mechanism 360.

In yet another embodiment, there is provided a method of making an object or part formed in whole or in part of a bulk-solidifying amorphous alloy having a connection mechanism protruding therefrom. The method includes forming an object or part formed in whole or in part of a bulk-solidifying amorphous alloy part having at least one extending protrusion, the protrusion having at least one contact surface. The method also includes insert casting or tack welding onto the protrusion a machinable metal having a hardness lower than the bulk-solidifying amorphous alloy and being capable of forming a metal-to-metal bond with the at least one contact surface of the at least one protrusion. The method concludes by machining the machinable metal to form the connection mechanism.

Figure 7:
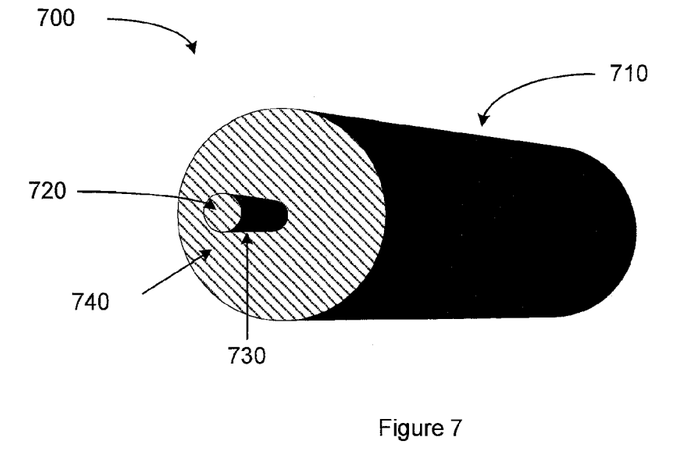
FIG. 7 provides a perspective view of a portion of a part having at least one extending protrusion.
Figure 8:
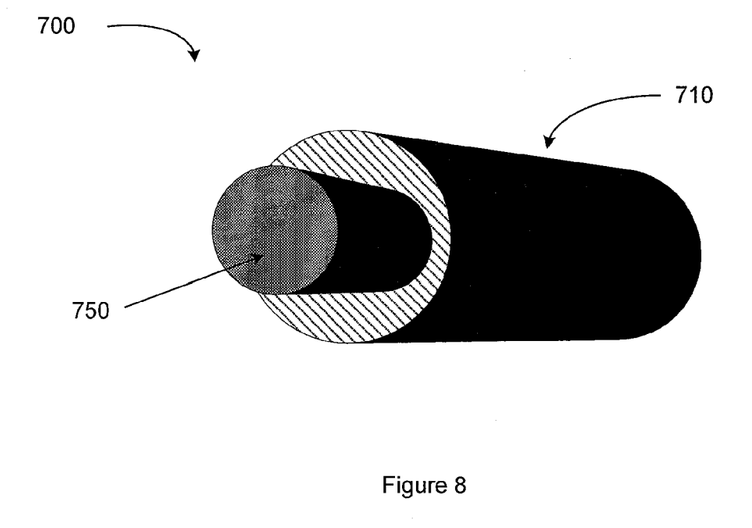
FIG. 8 provides a perspective view of a portion of the part of FIG. 7 whereby a machinable metal has been cast over the at least one extending protrusion.
Figure 9:
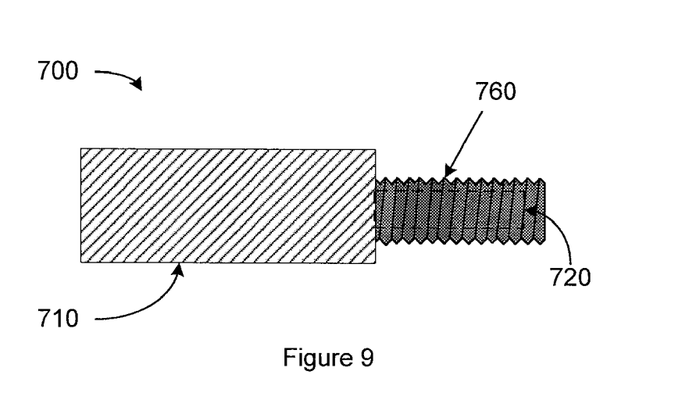
FIG. 9 provides a cross-sectional view of the part of FIG. 8, after the machinable metal has been machined to form a connection mechanism.

This alternative method is illustrated in FIGS. 7-9. As shown in FIG. 7, object or part 700 can be formed in whole or part from bulk-solidifying amorphous alloy portion 710 that includes at least one extending protrusion 720. The particular shape of bulk-solidifying amorphous alloy portion 710 is not critical to the invention and is shown as cylindrical solely for purposes of clarity. Such a part 710 might be useful, for example, in a turning machine in which the connection mechanism is connected to a rotating drive. Similarly, the size and shape of extending protrusion 720 also is not critical and can be cylindrical or any other suitable shape or size. Extending protrusion 720 includes at least one contact surface 730.

The method includes insert casting or tack welding onto extending protrusion 720 a machinable metal 750, as shown in FIG. 8. Machinable metal 750 also can be any suitable size and shape, and may extend to the outer surface of the bulk-solidifying amorphous alloy portion 710, or only partially, as shown in FIG. 8. Any method can be used to insert cast machinable metal 750 onto extending protrusion 720, and preferably a mold in the form of a sleeve (shown in FIGS. 10 and 11 as 975) can be placed adjacent bulk-solidifying amorphous alloy portion 710 to cast machinable metal 750 onto extending protrusion 720. The particular machinable metal 750 utilized, and the manner of making a metal-to-metal bond with at least one contact surface 730 can include any of the elements or methods described above with reference to FIGS. 3-6.

The final processing may include machining machinable metal portion 750 to form connection mechanism 760, as shown in FIG. 9. Extending protrusion 720 is shown as being encased by connection mechanism 760. If extending protrusion 720 is fabricated from the same bulk-solidifying amorphous alloy as portion 710, the presence of extending protrusion 720 within connection mechanism 760 provides the advantage of superior strength and resistance to breakage. Any machining technique can be used, including those described above with reference to FIG. 6. Part or object 700 now can be connected to another part using connection mechanism 760, including the part or object 300 show in FIG. 6. Again, the particular size and shape of connection mechanism 760 can vary and need not be comprised of a threaded extension as shown in FIG. 9. Because machinable metal 750 can be readily machined, the particular shape and size of connection mechanism 760 is virtually limitless and can include dove-tails, bulbs or protrusions along the longitudinally extent, chamfered edges, pyramidal, conical or other tapering configurations, and the like.

Another embodiment includes a method of making an object or part formed in whole or in part of bulk-solidifying amorphous alloy having a connection mechanism protruding therefrom. The method includes forming an object or part formed in whole or in part of a bulk-solidifying amorphous alloy part having an external surface and optionally having at least one extending protrusion, the protrusion having at least one contact surface. The method also includes, while forming the bulk-solidifying amorphous alloy portion, forming a machinable metal protrusion extending from the bulk-solidifying amorphous alloy portion, the machinable metal having a hardness lower than the bulk-solidifying amorphous alloy and being capable of forming a metal-to-metal bond with the external surface of the bulk-solidifying amorphous alloy part, and optionally with at least one contact surface of the at least one protrusion. The method concludes by machining the machinable metal to form the connection mechanism.

Figure 10:
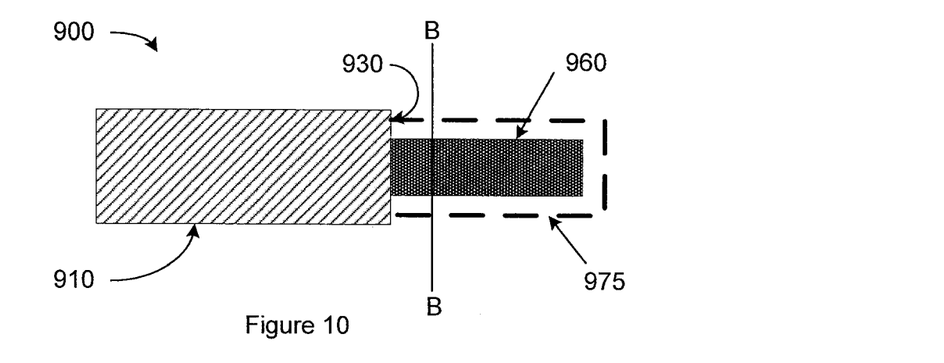
FIG. 10 provides a cross-sectional view of a part having no extending protrusion, and having a mold with a fillable cavity, the cavity filled with machinable metal.
Figure 11:
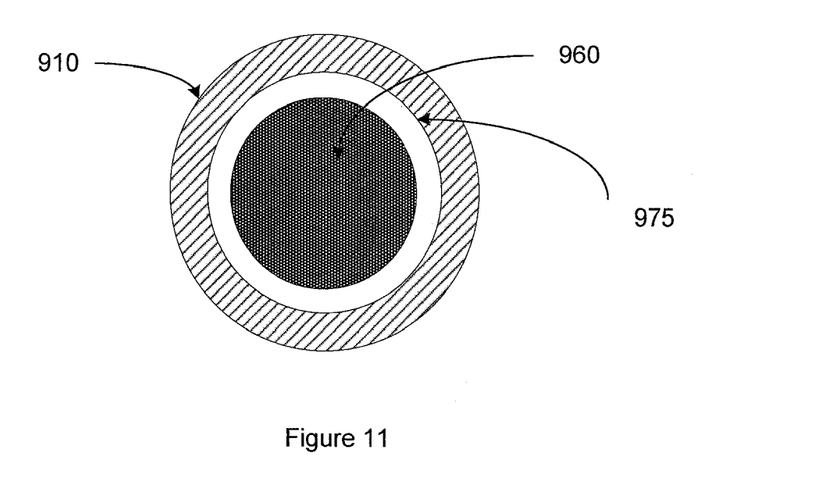
FIG. 11 provides a view of the part, mold, and machinable metal of FIG. 10 along line B-B.
Figure 12:
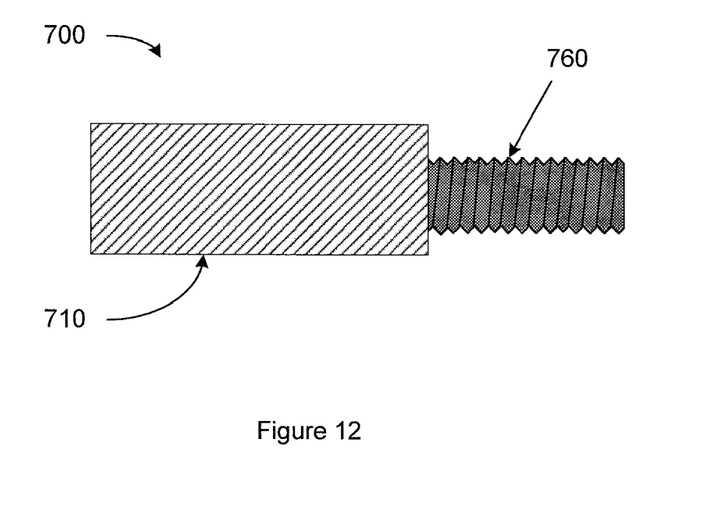
FIG. 12 provides a cross-sectional view of the part of FIG. 10, after the machinable metal has been machined to form a connection mechanism.

This embodiment is illustrated in FIGS. 10-12. In this method, part or object 900 could be formed so that machinable metal portion 960 is formed integrally with bulk-solidifying amorphous alloy portion 910. Forming the respective portions integrally can optionally include forming machinable metal portion 960 over an extending protrusion (not shown), so that formed part or object 900 is similar to that shown in FIG. 8. This alternative method eliminates the need for the subsequent formation of machinable metal portion 960. Integral formation of machinable metal portion 960 together with bulk-solidifying amorphous alloy portion 910 also could be accomplished using a mold sleeve 975 during the formation process, as shown in FIGS. 10 and 11.

Alternatively, bulk-solidifying amorphous alloy portion 910 can be formed to have an external surface 930, with no extending protrusion. After formation of part or object 900 having bulk-solidifying amorphous alloy portion 910, a machinable metal extending protrusion 950 can be insert cast onto external surface 930 using mold sleeve 975, or other suitable mold configuration, depending on the desired size and shape of machinable metal extending protrusion 950. Mold sleeve 975 could have a rectangular, square, pyramidal, conical, or any other suitable shape that enables insert casting or tack welding a machinable metal extending protrusion 950 and metal-to-metal contact with external surface 930. The particular machinable metal 950 utilized, and the manner of making a metal-to-metal bond with at least one contact surface 930 can include any of the elements or methods described above with reference to FIGS. 3-6.

The final processing may include machining machinable metal portion 950 to form connection mechanism 960, as shown in FIG. 12. Any machining technique can be used, including those described above with reference to FIG. 6. Part or object 900 now can be connected to another part using connection mechanism 960, including the part or object 300 show in FIG. 6. Again, the particular size and shape of connection mechanism 960 can vary and need not be comprised of a threaded extension as shown in FIG. 12. Because machinable metal 950 can be readily machined, the particular shape and size of connection mechanism 960 is virtually limitless and can include dove-tails, bulbs or protrusions along the longitudinally extent, chamfered edges, pyramidal, conical or other tapering configurations, and the like.

While the invention has been described in detail with reference to particularly preferred embodiments, those skilled in the art will appreciate that various modifications may be made thereto without significantly departing from the spirit and scope of the invention.

What is claimed:

1. A method of forming a connection mechanism in a bulk-solidifying amorphous alloy comprising:
    forming an object or part formed in whole or in part of a bulk-solidifying amorphous alloy, the bulk-solidifying amorphous alloy having positioned therein at least one cavity, the at least one cavity having at least one contact surface;
    insert casting or tack welding into the at least one cavity a machinable metal having a hardness lower than the bulk-solidifying amorphous alloy and being capable of forming a metal-to-metal bond with the at least one contact surface of the cavity; and
    machining the machinable metal to form the connection mechanism.

2. The method of claim 1, wherein the machinable metal is selected from the group consisting of aluminum, zinc, magnesium, tin, nickel, indium, antimony, copper, aluminum alloy, zinc alloy, magnesium alloy, tin alloy, nickel alloy, indium alloy, antimony alloy, copper alloy, and mixtures thereof.

3. The method of claim 1, wherein machining is selected from the group consisting of grinding, threading, milling, drilling, carving, cutting, turning, routing, and combinations thereof.

4. The method of claim 1, further comprising surface treating the at least one contact surface of the cavity prior to insert casting or tack welding.

5. The method of claim 1, wherein the object or part is formed entirely of a bulk-solidifying amorphous alloy material.

6. The method of claim 1, wherein the alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

7. The method of claim 1, wherein the alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

8. The method of claim 1, wherein the bulk solidifying amorphous alloy can sustain strains up to 1.5% or more without any permanent deformation or breakage.

9. A method of forming a connection mechanism in a bulk-solidifying amorphous alloy comprising:

forming an object or part formed in whole or in part of a bulk-solidifying amorphous alloy by forming the bulk-solidifying amorphous alloy portion so that it has positioned therein at least one cavity, the at least one cavity having at least one contact surface, and while forming the bulk solidifying amorphous alloy portion, also forming a machinable metal insert in the at least one cavity whereby the machinable metal insert has a hardness lower than the bulk-solidifying amorphous alloy and is capable of forming a metal-to-metal bond with the at least one contact surface of the cavity; and machining the machinable metal to form the connection mechanism.

10. A method of forming a connection mechanism in a bulk-solidifying amorphous alloy comprising:

forming an object or part formed in whole or in part of a bulk-solidifying amorphous alloy part having at least one extending protrusion, the protrusion having at least one contact surface;

insert casting or tack welding onto the extending protrusion a machinable metal having a hardness lower than the bulk-solidifying amorphous alloy and being capable of forming a metal-to-metal bond with the at least one contact surface of the at least one protrusion; and machining the machinable metal to form the connection mechanism.

11. The method of claim 10, wherein insert casting or tack welding is carried out using a mold to form a machinable metal protrusion surrounding the extending protrusion.

12. The method of claim 10, wherein the machinable metal is selected from the group consisting of aluminum, zinc, magnesium, tin, nickel, indium, antimony, copper, aluminum alloy, zinc alloy, magnesium alloy, tin alloy, nickel alloy, indium alloy, antimony alloy, copper alloy, and mixtures thereof.

13. The method of claim 10, wherein machining is selected from the group consisting of threading, milling, drilling, carving, cutting, turning, routing, and combinations thereof.

14. The method of claim 10, further comprising surface treating the at least one contact surface of the extending protrusion prior to insert casting or tack welding.

15. The method of claim 10, wherein the object or part is formed entirely of a bulk-solidifying amorphous alloy material.

16. The method of claim 10, wherein the alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

17. The method of claim 10, wherein the alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

18. The method of claim 10, wherein the bulk solidifying amorphous alloy can sustain strains up to 1.5% or more without any permanent deformation or breakage.

19. A method of forming a connection mechanism in a bulk-solidifying amorphous alloy comprising:

forming an object or part formed in whole or in part of a bulk-solidifying amorphous alloy part having an external surface, the external surface optionally having at least one extending protrusion having at least one contact surface, and while forming the bulk-solidifying amorphous alloy portion, forming a machinable metal protrusion extending from the bulk-solidifying amorphous alloy portion, the machinable metal having a hardness lower than the bulk-solidifying amorphous alloy and being capable of forming a metal-to-metal bond with the external surface of the bulk-solidifying amorphous alloy part, or optionally with the at least one contact surface of the at least one extending protrusion; and machining the machinable metal to form the connection mechanism.

20. The method of claim 19, wherein the machinable metal protrusion is formed using a mold.

* * * * *